July 31, 1962 M. G. NORTHRUP ETAL 3,046,717
FILTER AND PRECIPITATOR
Filed March 6, 1961

INVENTORS.
MILTON G. NORTHRUP
DALE F. PINKERTON
BY R.E. Giauque
ATTORNEY

United States Patent Office 3,046,717
Patented July 31, 1962

3,046,717
FILTER AND PRECIPITATOR
Milton G. Northrup, Van Nuys, and Dale F. Pinkerton, Chatsworth, Calif., assignors to The Marquardt Corporation, Van Nuys, Calif., a corporation of California
Filed Mar. 6, 1961, Ser. No. 93,484
2 Claims. (Cl. 55—320)

This invention relates to filter apparatus and more particularly to a mechanical separator by means of which suspended particles or drops of liquid are removed from a gas stream.

A variety of filters have been proposed heretofore for separating aerosols and for precipitating smoke, vapors and fogs from a gas stream. Generally, these previous devices remove solids or liquids from the gases by forcing the fluid by hydrostatic pressure through a filter medium which retains the solids or liquids and which are absorbed by the filter medium or cake thereon, allowing the gases to pass through. Such filters require frequent interchange or cleaning which renders their use uneconomical. Attempts to design non-absorbent filters or filters which do not require frequent cleaning have not always been successful.

The present invention overcomes the problems attendant prior filters, including those of the non-absorbent type by a novel and improved construction in which the incoming gases are distributed over a large area before passing through the non-absorbent filter element. This allows the gases to pass through the filter media at low velocity, with a low pressure drop throughout the media. With the gases equally distributed throughout the cross section of the filter material, "channeling" of the gases through the filter media is prevented and other advantages are realized, as will become apparent from the description given hereinafter.

Particle collection systems depend upon subjecting the suspended particles to some force which will drive them mechanically to a collecting surface. To function successfully, any collection device must have an adequate means for continuously or periodically removing collected material from the equipment.

Inasmuch as the filter media of the present invention does not absorb the entrained liquid and/or solid materials, but causes them to condense or precipitate on the surfaces of the filter element from which they are continuously removed, it is not necessary to replace the filter media after extensive use. The material separated from the gas stream is caused to migrate to the bottom of the device, under the influence of gravity, where it may be drained off. The velocity of the gases passing through the apparatus is maintained at a sufficiently low level as to not interfere with this downward migration.

It is a principal object of the invention to provide a novel and improved liquid-gas filter which achieves a superior degree of separation.

Another object of the invention is to provide a novel and improved solid-gas filter of improved characteristics.

Another object of the invention is to provide novel and improved filter and precipitator apparatus employing non-absorbent filter media.

Another object of the invention is to provide a filter from which the separated material may be continuously or periodically withdrawn without handling of the filter media.

Yet another object of the invention is to provide a filter-precipitator having a low pressure drop and which will eliminate droplets of a fog from a stream of process gas.

Still another object of the invention is to provide a novel and improved vapor collector having means to continuously remove the collected precipitate.

These and other objects of the invention will be understood more completely from the following detailed description taken in conjunction with the drawings, in which.

The apparatus of the invention may be used to separate a solid dispersed phase from a gas dispersing phase, such as smoke, airborne dust, etc., or may be used to separate a liquid dispersed phase from a gas dispersing phase, such as fogs, aerosols and vapors. However, the exemplary embodiment discussed hereinafter is particularly suited to separating oil vapors from the exhaust of vacuum pumps, thus preventing contamination of the atmosphere.

Figure 1:
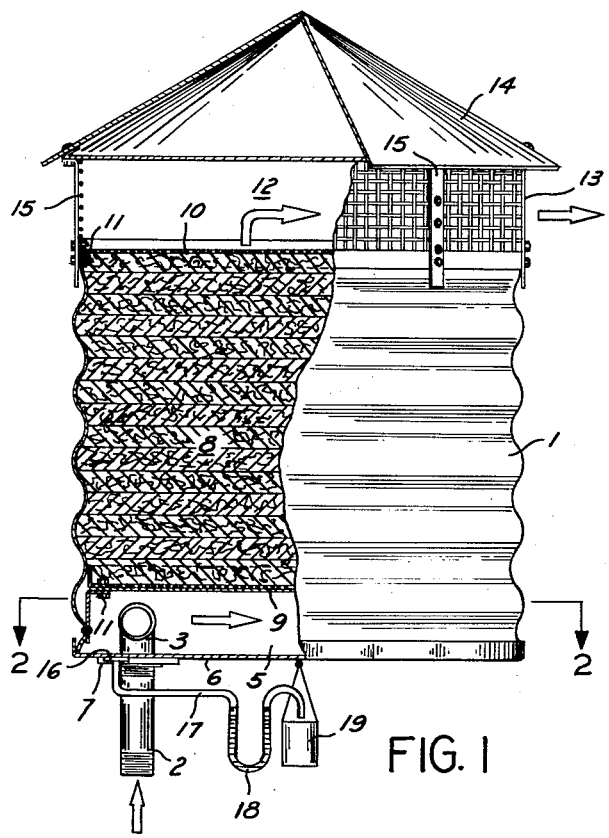
FIGURE 1 is an elevation view, partially in section, illustrating the device.
Figure 2:
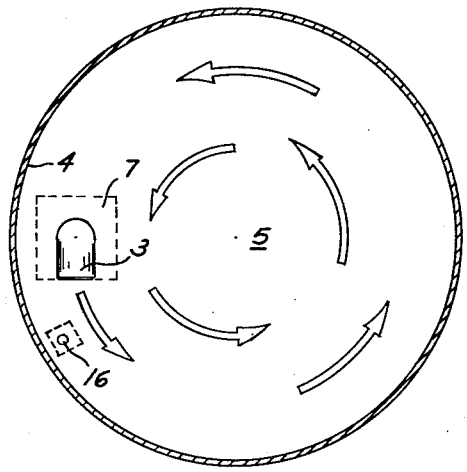
FIGURE 2 is a cross section on line 2—2 of FIGURE 1.

Looking now at FIGURE 1, there is shown an illustrative embodiment of the apparatus suitable for use in precipitating oil vapors from the exhaust of a vacuum pump.

It can be shown that the efficiency of a precipitator depends exponentially on the stream residence time in the precipitator, thus a slower flow rate will result in an increase in efficiency. For this reason, the inlet passage to the apparatus communicates with an expansion chamber where the velocity of the moving gas stream may be reduced. The gas stream enters at the bottom of the precipitator housing 1 through conduit 2 which in turn is coupled to elbow 3. Elbow 3 is located near the peripheral wall 4 of the enclosing housing 1 and communicates with expansion chamber 5. Elbow 3 may be attached to end wall 6 by means of flange 7 or other suitable fastening means. Elbow 3 imparts a vortical flow pattern to the gases so that they circulate in chamber 5 before passing upward at greatly reduced velocity through the apertures in perforate member 9. This arrangement resembles the well known cyclone separator and provides an aiding separating action in which the gas enters the cylindrical chamber tangentially and leaves axially. Suspended matter, carried by the swirling gas, is thrown out by centrifugal force to the peripheral wall 4 where it is collected. Thus, centrifugal force is used in place of the force of gravity, which is insufficient to give adequate separation.

The expansion of the gas stream as it enters chamber 5 results in a substantial decrease in the velocity of the stream leaving the chamber. Filter media 8 comprises fiberglass matting, glass wool, or similar non-absorbent fibrous material. By way of example, the filter media may comprise a plurality of circular pads cut from type "TW–F Fiber-glass batting" manufactured by the Owens-Corning Fiber-Glas Corporation. The filter media 8 is held in place between perforate members 9 and 10. Members 9 and 10 may be fabricated from galvanized steel hardware cloth cut into circular pieces having a diameter just slightly less than the interior diameter of housing 1. They may be secured therein by any suitable fastening means 11.

The filter media 8 acts as a non-absorbent impingement separator. Impingement separators act on the principle that when a fluid, ordinarily a gas, is given a sharp change in direction, any particulates therein, because of their inertia, do not conform to the new direction of flow, but continue to move nearly in the original direction. Then they strike the solid surface of the apparatus, which may consist of a bed of solid shapes, or a bed of liquid covered fibers, or other collecting surfaces. The particles striking these surfaces coalesce and are removed from the gas stream. The gases passing upward through the filter media 8 must follow a tortuous path thus resulting in the solids and liquids carried in suspension being deposited on the surfaces of the filter media. In addition, as the gases pass over the filamentary strands of glass fiber, an electrostatic charge is set up between the fiber and the non-gaseous particles suspended in the gas stream. This charge creates an attraction between the fiber of the media and the suspended particles which cause the latter to cling to the fibers. As the deposit of particles or liquid builds up, a quantitative limit is reached beyond which the attraction is no longer able to support the mass of precipitate. As a result, the collected deposit will be caused to migrate downward to the bottom of housing 1, under the action of gravity, where it may be withdrawn through drain 16. After passing through the filter media and top member 10, the gases flow into chamber 12 and out of the precipitator through opening 13. Opening 13 is covered by weather cover 14, which is attached to housing 1 by any suitable fastening means 15.

As is recognized by those versed in the art, there is no comprehensive theory applicable in every case for the separation of particles or droplets from a moving gas stream which is usually in turbulent flow. Therefore, variations in the design geometry, flow pattern and other variables of the installation may be modified to meet the requirements of a particular application. In the illustrative embodiment described hereinbefore, it has been found that the efficiency of the apparatus may be further enhanced by employing a housing having corrugated walls. The corrugations prevent the gases from finding a direct route upwards along the side of the enclosing housing and bypassing the filter media.

Ideally, the fiber diameter of media 8 should be small compared to the particle or droplet size and the mesh large compared to the particle or droplet size. Efficiency is greatly influenced by the particle or droplet size distribution in the stream. If a particle in the stream comes in contact with a solid surface of the media, it will tend to adhere because of Van der Waals forces and other forces of an electrostatic nature. Very large particles may require a sticky surface. Because of this tendency to adhere, the particles collected on the surface tend to increase in size and decrease in number until a substantial degree of coalescence occurs.

There is no screening action, but the particles are caught by accidental collision with the fibers where they are held by natural forces (Van der Waals or other electrical forces).

In the vacuum pump exhaust application referred to above, the principal constituent of the material separated from the gas stream will be oil. Thus, the precipitated material will be a liquid which will migrate to the bottom of the housing 1. This liquid may be conveniently removed via conduit 17 which communicates with the interior of the precipitator apparatus via drain 16. Trap 18 may be included in conduit 17 to provide a gas-tight seal, in a manner well known to those skilled in the art. Container 19 collects the liquid from conduit 17.

The size and configuration of the drain portion of the apparatus will be determined by the nature of the precipitate.

While there have been shown and described and pointed out the fundamental novel features of a filter and precipitator as applied to a preferred embodiment of the invention, it will be understood that various omissions and substitutions and changes in the form and details of the device illustrated and in its operation may be made by those skilled in the art, without departing from the spirit of the invention. For example, the exhaust of the apparatus may communicate with a conduit, duct, or other outlet passageway for carrying the filtered fluid stream, in the event that it is not desired to exhaust directly into the atmosphere. Also, the apparatus may have any desired sectional geometry and should not be construed as being limited to the cylindrical configuration shown. Therefore, it is intended that the invention be limited only as indicated by the scope of the following claims.

What is claimed is:

1. Filter and precipitator apparatus comprising, an elongate cylindrical housing having a corrugated wall portion intermediate the ends thereof, first and second perforate members mounted within said housing transversely of and spaced apart along the longitudinal axis thereof, said perforate members defining an intermediate chamber having an axial length co-extensive with the axial length of said corrugated wall portion, an expansion chamber within said housing and located adjacent said first perforate member, fluid inlet means connected with said expansion chamber and adapted to impart a vortical flow pattern to fluid entering said expansion chamber, fiberglass filter media substantially filling the space between said perforate members and the corrugations of said corrugated wall portion thereby preventing channeling of fluid along the walls of said housing between said first and said second perforate members, and fluid outlet means co-extensive with and located adjacent said second perforate member to provide axial flow discharge of fluid passing through said second perforate member.

2. A vapor collector for separating the dispersed liquid phase from the dispersing gaseous phase of a vapor, comprising; a housing, first and second perforate members mounted within said housing transversely of and separated apart along the longitudinal axis thereof, said housing having a corrugated wall section between said perforate members, inlet passage means through which vapor may be introduced into said housing, an expansion chamber located within said housing between said first perforate member and said inlet passage and having a greater cross-sectional area than the cross-sectional area of said inlet passage means thereby providing a substantial reduction in the velocity of vapor entering said expansion chamber, a fluid conduit within said chamber connected to said inlet passage and having a sharp angular bend for imparting a swirling motion to said vapor within said chamber, non-absorbent fibrous filter media substantially filling the space between said perforate members and the corrugations of said corrugated wall section, outlet passage means located adjacent said second perforate member and co-extensive therewith for axial flow discharge of the dispersing gas phase of said vapor passing through said second perforate member, drain means having an integral gas-tight trap connected with said expansion chamber through which the liquid removed from the vapor by said filter media may be continuously withdrawn, and mounting means attached to said housing means for holding said housing inclined from the horizontal, to permit the liquid removed by said media to migrate to said drain means under the action of gravity.

References Cited in the file of this patent

UNITED STATES PATENTS

| 1,423,412 | Garner | July 18, 1922 |
| 1,531,602 | Folker | Mar. 31, 1925 |
| 1,596,060 | Mase | Aug. 17, 1926 |
| 2,138,874 | Myers | Dec. 6, 1938 |
| 2,952,331 | Beach | Sept. 13, 1960 |